(12) United States Patent
Scalisi et al.

(10) Patent No.: US 7,728,724 B1
(45) Date of Patent: Jun. 1, 2010

(54) SYSTEM FOR LOCATING INDIVIDUALS AND OBJECTS

(75) Inventors: Joseph F. Scalisi, Yorba Linda, CA (US); Desiree C. Mejia, Yorba Linda, CA (US)

(73) Assignee: Location Based Technologies, Inc., Irvine, CA (US)

( * ) Notice: Subject to any disclaimer, the term of this patent is extended or adjusted under 35 U.S.C. 154(b) by 786 days.

(21) Appl. No.: 11/048,395

(22) Filed: Feb. 1, 2005

(51) Int. Cl.
*G08B 1/08* (2006.01)
(52) U.S. Cl. .............................. 340/539.13; 340/539.1; 340/539.11; 340/539.15; 340/539.32; 340/573.1; 340/825.36; 340/825.49
(58) Field of Classification Search ............ 340/539.13, 340/539.1, 539.11, 539.15, 539.32, 573.1, 340/573.4, 574.4, 82, 5.36, 825.49
See application file for complete search history.

(56) References Cited

U.S. PATENT DOCUMENTS

| | | | | |
|---|---|---|---|---|
| 5,485,163 | A | 1/1996 | Singer et al. | 342/457 |
| 6,362,778 | B2 | 3/2002 | Neher | 342/357.07 |
| 6,388,612 | B1 | 5/2002 | Neher | |
| 6,693,585 | B1 | 2/2004 | MacLeod | 342/357.07 |
| 6,720,879 | B2 | 4/2004 | Edwards | 340/573.3 |
| 6,801,850 | B1 | 10/2004 | Wolfson | 701/209 |
| 6,812,824 | B1 | 11/2004 | Golddinger | |
| 7,038,590 | B2 * | 5/2006 | Hoffman et al. | 340/573.1 |
| 7,123,141 | B2 * | 10/2006 | Contestabile | 340/539.13 |
| 7,135,967 | B2 * | 11/2006 | Culpepper et al. | 340/539.21 |
| 7,180,422 | B2 * | 2/2007 | Milenkovic et al. | 340/572.4 |
| 7,250,860 | B2 * | 7/2007 | Smith et al. | 340/539.22 |
| 2002/0186135 | A1 | 12/2002 | Wagner | |
| 2004/0198382 | A1 | 10/2004 | Wong | 455/456.1 |
| 2006/0009152 | A1 | 1/2006 | Millard | |

\* cited by examiner

*Primary Examiner*—Daryl C Pope
(74) *Attorney, Agent, or Firm*—Law Office of Robert E. Kasody, P.C.

(57) ABSTRACT

A positioning and tracking system may comprise a monitoring station for receiving a location request and a user's identification code and transmitting a signal; a tracking device, which includes a signal receiver for receiving a signal from the monitoring station, including the user's identification code, a microprocessor/logic circuit for storing a first identification code, and generating a position signal; an erasable programmable read-only memory; a global positioning system logic circuit; a signal transmitter; and a plurality of transmitter/receiver stations for communicating between the tracking device and the monitoring station; wherein the tracking device compares the user's identification code to the stored identification code and upon determining that the user's identification code matches the stored identification code, the signal transmitter transmits the position signal to the monitoring station.

21 Claims, 8 Drawing Sheets

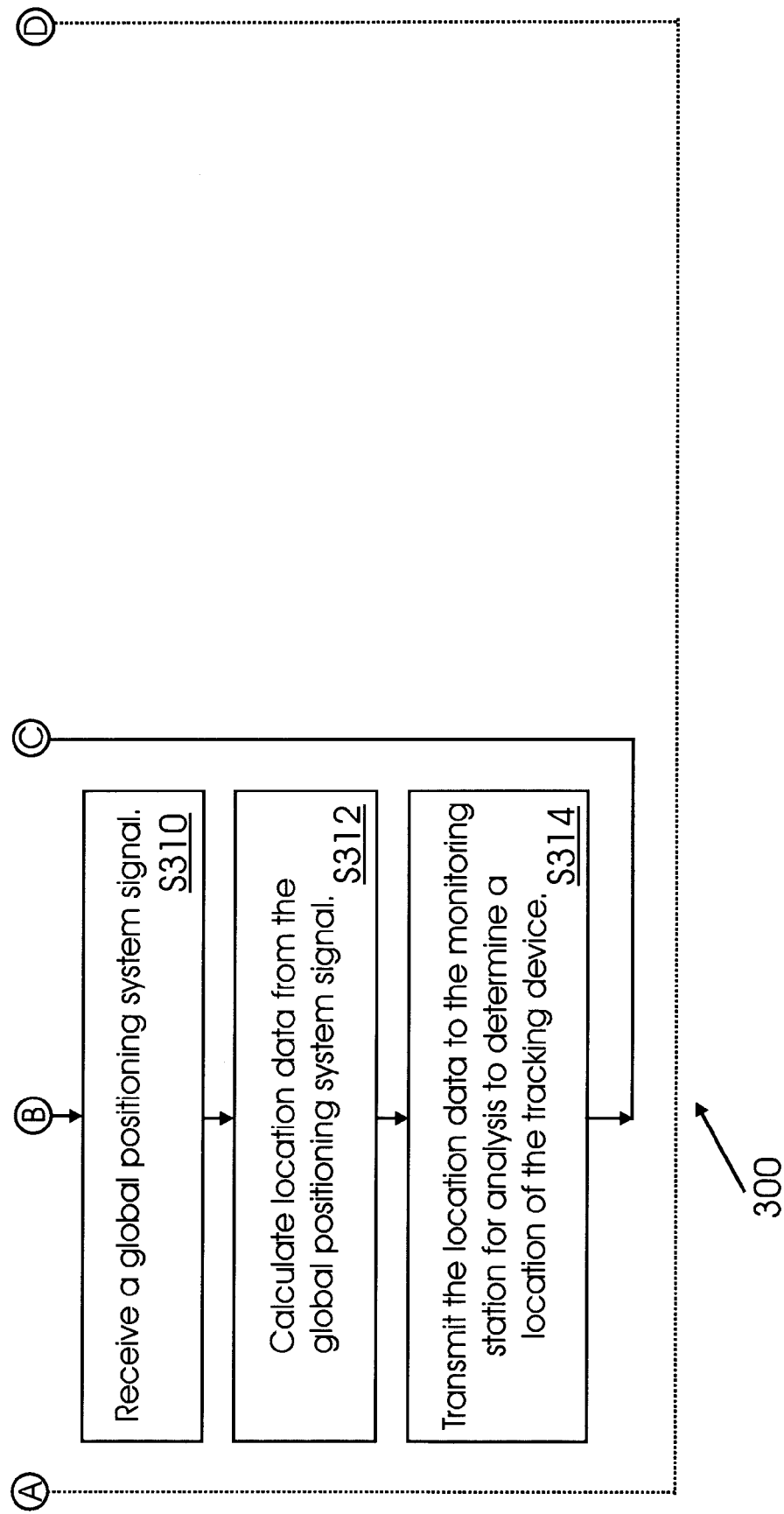

SYSTEM FOR LOCATING INDIVIDUALS AND OBJECTS

BACKGROUND OF THE INVENTION

The present invention relates generally to location systems. More particularly, the present invention relates to a system for locating individuals and objects with a tracking unit using location technologies including a global positioning system (GPS) and a General Packet Radio Service (GPRS) for pinpointing the location of the tracking unit, and thus the individual or the object.

A need exists for determining the location of individuals that are believed to be abducted or lost (such as children, Alzheimer's syndrome patients, or mentally ill persons) or if a parent, guardian or property owner simply desired to verify the location of their child or property as an added measure of security and to achieve a certain level of peace of mind of knowing that the child or object is in its proper place.

Domesticated animals, including pets, may be tracked with conventional systems. Interested persons, such as zoologists, may track wild animals to study animal behavior and for collecting data.

Objects may also be located and tracked with conventional systems. For example, merchants may choose to track the location of goods and merchandise to guard against theft. Automobile owners often use location systems to facilitate recovery of stolen automobiles, such as the Lojack™ vehicle recovery system offered by the LoJack Corporation of Westwood, Mass., in the United States. Automobile owners, such as rental agencies, often track the location of automobiles rented by customers to ensure that the automobile is not removed to a location outside of a contracted boundary for rental use. Other location systems facilitate navigation when traveling, such as the OnStar™ system offered by the OnStar Corporation of Detroit, Mich., in the United States.

GPS technology is often incorporated in conventional location systems. Such technology, however, is generally limited to outdoor, line-of-sight uses. Consequently, finding the location of an individual or an object is difficult, or impossible for an indoor location or a location that is obstructed by a large structure (such as a tall building, a bridge, a dam, and the like) or geographical features (such as a mountain, a hill, a valley, a canyon, a cliff, and the like).

It would thus be advantageous to provide a system and a method for locating and tracking an individual or an object that may be located indoors or at a site that is outside the line-of-sight.

SUMMARY OF THE INVENTION

In one aspect of the present invention, a positioning and tracking system comprises a monitoring station for receiving a location request and a second identification code from a user and transmitting a signal that includes the second identification code; a tracking device, the tracking device comprising; a signal receiver for receiving a signal from the monitoring station, comprising the second identification code, a microprocessor/logic circuit for storing a first identification code to produce a stored identification code, calculating location data for the tracking device, and generating a position signal; an erasable programmable read-only memory; a global positioning system logic circuit; and a signal transmitter; a first transmitter/receiver station for communicating between the tracking device and the monitoring station; a second transmitter/receiver station for communicating between the tracking device and the monitoring station; and wherein the tracking device compares the second identification code to the stored identification code and upon determining that the second identification code matches the stored identification code, the signal transmitter transmits the position signal to the monitoring station.

In another aspect of the present invention, a method for locating a tracking device comprises activating the tracking device; receiving a signal sent, from a monitoring station, to the tracking device, the signal including a user's identification code; recognizing the user's identification code as a location request pertaining to the tracking device; formatting a response to the location request, the response including location data pertaining to the tracking device; sending the response to a server; and drawing the tracking device location within a map.

In still another aspect of the present invention, a method for locating an individual or an object comprises associating a tracking device with the individual or the object to be located; receiving a location request from a user; transmitting a signal from a monitoring station to the tracking device; activating a global positioning system circuit within the tracking device; receiving a global positioning system signal; calculating location data from the global positioning system signal; transmitting the location data to the monitoring station for analysis to determine a location of the tracking device; and informing the user of the location of the tracking device.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a system and method for locating and tracking an individual or an object. The system produced according to the present invention may find beneficial use for locating and tracking people, such as missing, lost, or abducted persons, Alzheimer's syndrome patients, or mentally ill persons. The system may also be useful for locating and tracking animals. Additionally, objects, such as vehicles, goods, and merchandise may be located and tracked with the system produced by the present invention. Although the following discussion may use lost or abducted child as an exemplary demonstration, it is to be understood that this discussion is not limiting and that the present invention may be used in other suitable applications.

The present invention may be used to locate and track a tracking device that may be easily concealed by an individual (such as in a pocket, backpack, or shoe), unlike conventional tracking systems that may be in the form of a large "watch" conspicuously worn on an individual's wrist. In the event of an abduction, an abductor is likely to remove and discard such a conspicuous device, along with any mobile phones, pagers, personal data assistants, or any other recognizable electronic device.

Additionally, conventional systems depend upon maintaining direct outdoor line-of-sight between a global positioning system (GPS) satellite and a tracked object. The system of the present invention does not require direct line-of-sight and the system effectively locates and tracks individuals and objects in indoor situations.

Conventional systems often require an individual to manually activate a location system before signals can be received and transmitted between the individual and a person attempting to locate the individual. However, the system of the present invention is passive, in that a user remotely activates the tracking device once the user begins an attempt to locate the tracking device for receiving and transmitting signals. No action is required on the behalf of an individual being located and tracked.

Figure 1A:
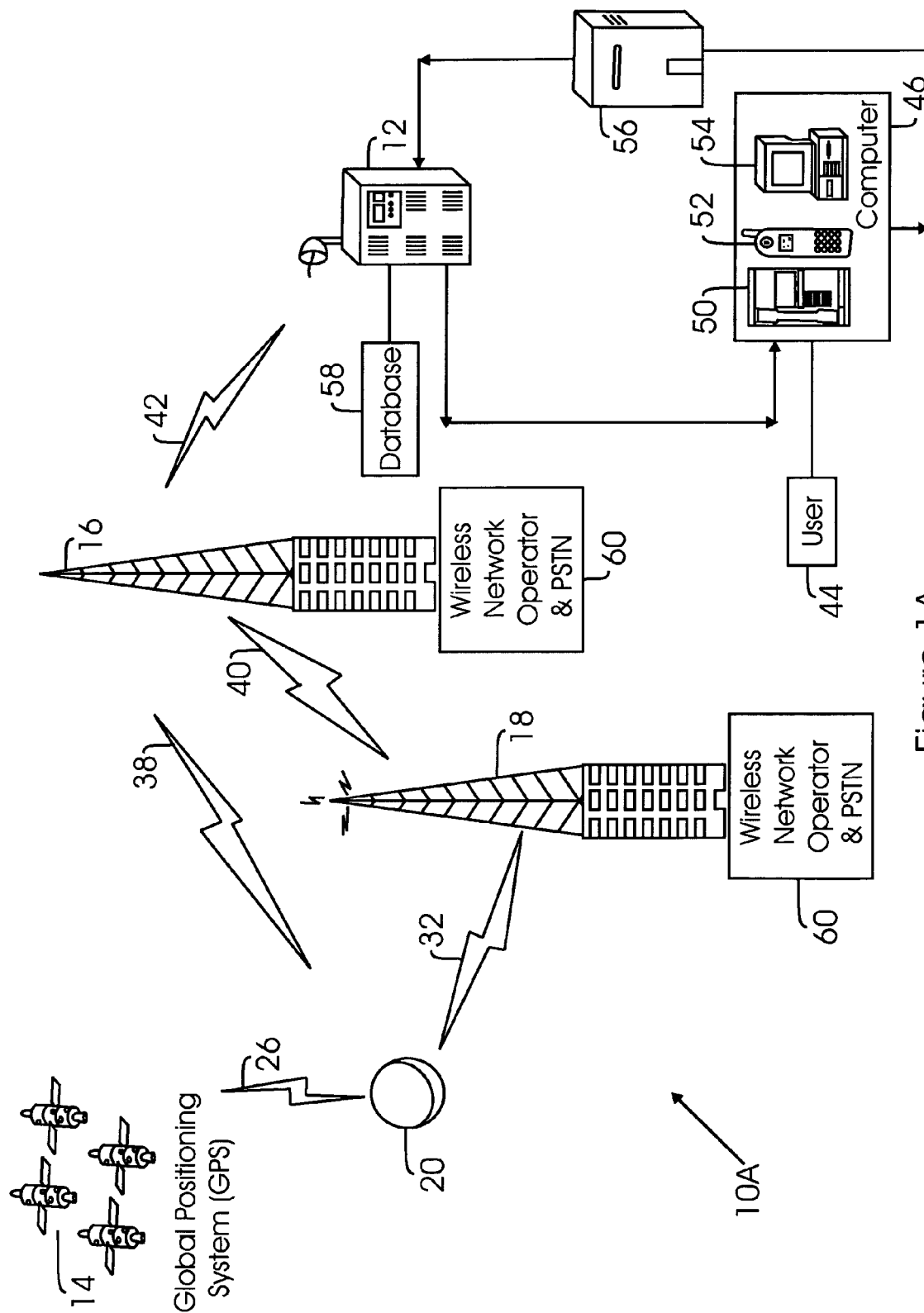
FIG. 1A is a plan view of a positioning and tracking system for locating a tracking device, according to an embodiment of the present invention.

FIG. 1A shows a plan view of a positioning and tracking system 10A for locating a tracking device 20. The tracking device 20 may already be programmed with a stored identification code (first identification code). When a user 44 attempts to remotely activate the tracking device 20, the system 10A of the present invention may transmit the user's identification code (second identification code) to the tracking device 20. The tracking device 20 may compare the stored identification code with the user's identification code. If the identification codes match, then the user 44 may receive location data (such as a longitudinal, latitudinal, and elevational position, an address, a nearby landmark, and the like) that indicates the location of the tracking device 20.

The positioning and tracking system 10A may comprise a monitoring station 12 for receiving a location request and user's identification code from the user 44 and transmitting a signal 42 that includes the user's identification code. The location request may be a request from the user 44 for location data that would indicate the location of the tracking device 20.

When the user 44 seeks to locate and track an object, such as a tracking device 20, the user 44 may issue the location request to the monitoring station 12 using a communication device 46. Some examples of communication devices 46 are a land-based telephone 50 ("landline"), a mobile telephone 52, such as a cellular or Personal Communications System (PCS) telephone, a computer 54 connected to the Internet (not shown), a personal digital assistant (not shown), a radio (not shown), a pager (not shown), hand delivery (not shown), or any other form of communication to issue a location request. The user 44 may provide the monitoring station 12 with the user's identification code.

The user 44 is able to provide the location request to the monitoring station 12 by at least one of a telephone communication and an electronic message via the Internet (not shown). The monitoring station 12 may provide the position signal to the user 44 as an electronic message over the Internet when the user 44 provides the location request by an electronic message via the Internet. The monitoring station 12 may provide the position signal to the user 44 as a voice message when the user 44 provides the location request by a telephone communication.

The location request and any response from the monitoring station 12 may be sent to a server 56. The server 56 may be used in cooperation with the monitoring station 12 for verifying information transmitted and received between the user 44 and the monitoring station 12.

The monitoring station 12 may include a database 58 for storing the user's identification code sent by the user 44. The monitoring station 12 may compare the user's identification code, received with the location request, to the stored identification code in the database 58 for determining if the user's identification code (received from the user 44 with the location request) is valid.

The system 10A may communicate in data format only, and therefore the system 10A will not compete for costly voice spectrum resources. Therefore, the present invention does not require the use of a mobile identification number (MIN). The identification codes (first identification code and second identification code) may comprise an electronic serial number (ESN).

The user's identification code may be transmitted within the signal 42 to the tracking device 20 directly. The tracking device 20 may compare the user's identification code sent by the user 44 with the stored identification code within the tracking device. Upon determining that the user's identification code is valid and that the user's identification code matches with the stored identification code, the tracking device 20 may communicate location data (such as a longitudinal, latitudinal, and elevational position, an address, a nearby landmark, and the like) to the monitoring station 12 for delivery to the user 44.

Global positioning system (GPS) satellites 14 may provide location data (such as a longitudinal, latitudinal, and elevational position, an address, a nearby landmark, and the like) to the tracking device 20. GPS satellites 14 are maintained and operated by the United States Department of Defense. The time it takes a global positioning system signal 26 from a GPS satellite 14 to reach the tracking device 20 is used to calculate the distance from the GPS satellite 14 to the tracking device 20. Using measurements from multiple GPS satellites 14 (for example, four GPS satellites 14), the system 10A may triangulate a location for the tracking device 20, providing a latitude and a longitude by comparing the measurements from the multiple GPS satellites 14 to the tracking device 20 and measurements of the distances between two or more GPS satellites 14, and measurements of the relative orientations of the GPS satellites 14, the tracking device 20, and the earth.

Continuing with FIG. 1A, the system 10A may comprise a first transmitter/receiver station 16 for communicating between the tracking device 20 and monitoring station 12. The first transmitter/receiver station 16 may be connected to a wireless network operator and a public switched telephone network (PSTN) 60. The user's identification code may be sent within a signal, for example, a signal 38 to the first transmitter/receiver station 16.

The signal 38 may then be sent from the first transmitter/receiver station 16 to the tracking device 20. A second transmitter/receiver station 18 may be used within the system 10A for locating and tracking the tracking device 20. The second transmitter/receiver station may be used for communicating between the tracking device 20 and the monitoring station 12.

General packet radio service (GPRS) signals may be used to locate and track the tracking device 20. GPRS is a non-voice service that allows information to be sent and received across a mobile telephone network. GPRS may supplement Circuit Switched Data (CSD) and Short Message Service (SMS). Although the acronym GPRS is similar to the acronym GPS, GPRS is not related to GPS. GPRS is an alternative service for locating and tracking individuals and objects.

A plurality of transmitter/receiver stations, such as the first transmitter/receiver station 16 and the second transmitter/receiver station 18 in FIG. 1A, may be used to send location data between the tracking device 20 and the monitoring station 12. The first transmitter/receiver station 16 may communicate with the tracking device 20 with the signal 38 and the second transmitter/receiver station 18 may communicate with the tracking device 20 with a signal 32. A signal 40 may serve to communicate between the first transmitter/receiver station 16 and the second transmitter/receiver station 18. By triangulating the location of the tracking device 20, a location may be determined for the tracking device 20.

Figure 1B:
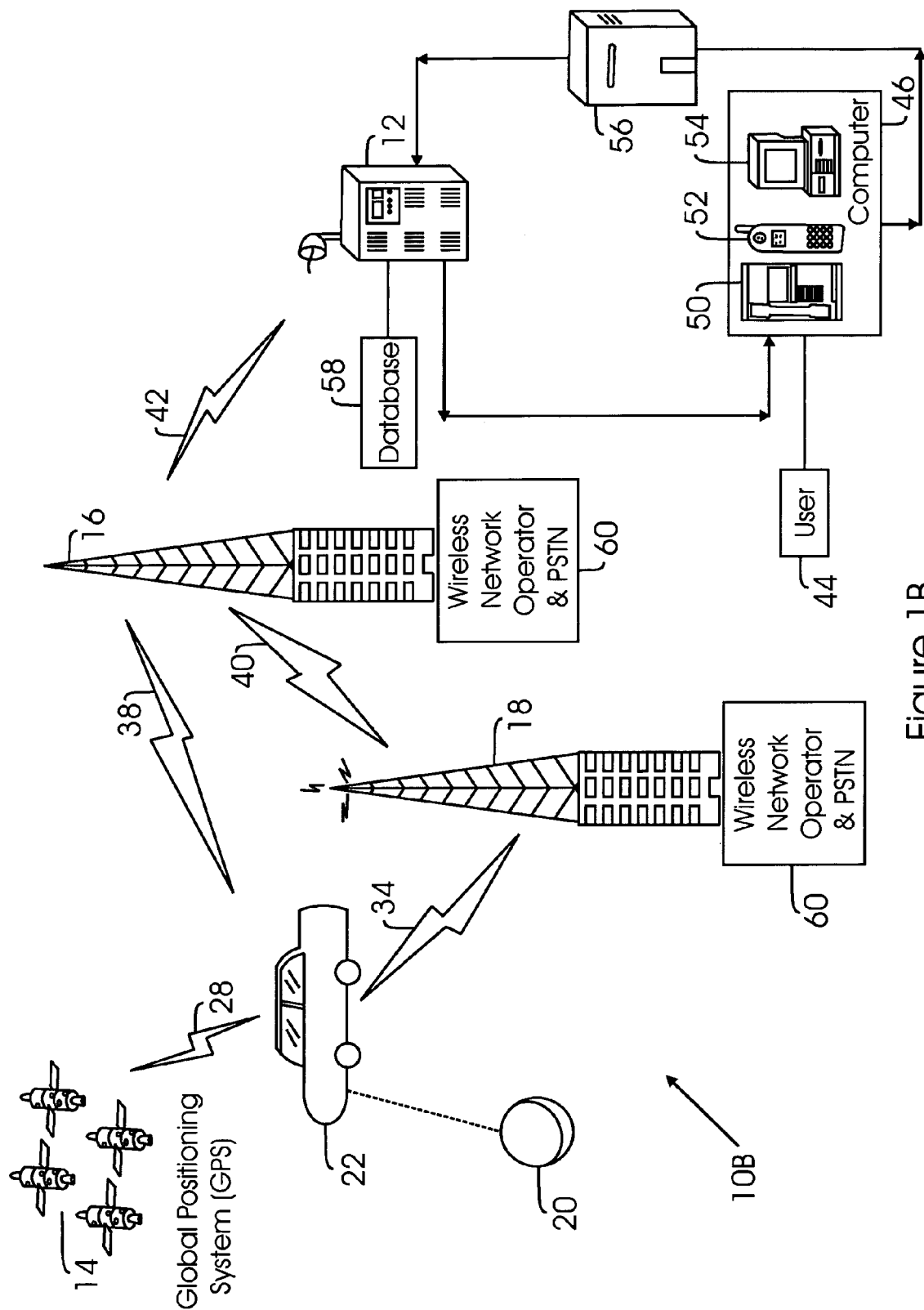
FIG. 1B is a plan view of a positioning and tracking system for locating an object, according to an embodiment of the present invention.

The system 10A may be used for locating and tracking the tracking device 20. The tracking device 20 may be associated with an object, such as an automobile 22, as shown in FIG. 1B. By placing the tracking device 20 anywhere within or on the automobile 22, a system 10B may locate and track the automobile 22 as described above regarding locating and tracking the tracking device 20 in FIG. 1A. In a manner similar to GPS and GPRS tracking described in FIG. 1A, the automobile 22 may be tracked by the GPS system 14 through a signal 28 and through GPRS via a signal 34 and the signal 38.

Figure 1C:
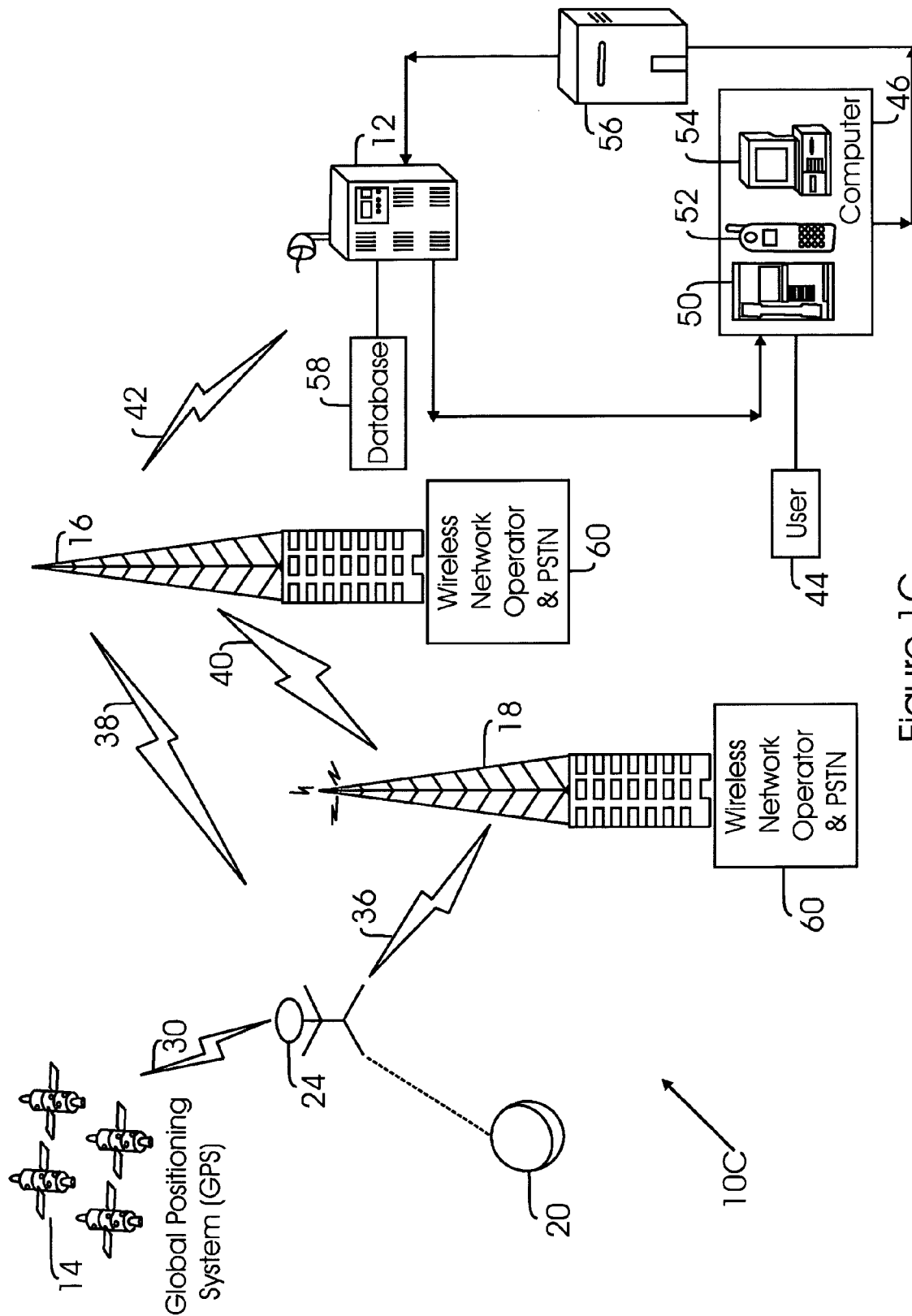
FIG. 1C is a plan view of a positioning and tracking system for locating an individual, according to an embodiment of the present invention.

Likewise, a system 10C may be used for locating and tracking an individual 24, as shown in FIG. 1C. The individual 24, such as a child, may be located and tracked when the individual 24 possesses the tracking unit 20. For example, the individual 24 may carry the tracking device 20 in a pocket in the individual's clothing (not shown), in a backpack (not shown), wallet (not shown), purse (not shown), a shoe (not shown), or any other convenient way of carrying the tracking device 20. As similarly described above regarding FIGS. 1A and 1B, locating and tracking the individual may be accomplished through a signal 30, a signal 36, and the signal 38.

It is to be understood that although the automobile 22 (shown in FIG. 1B) and the individual 24 (shown in FIG. 1C) are herein used to exemplify locating and tracking, the systems 10A-C may be used to locate and track many other objects, inanimate (such as merchandise or any vehicle) and animate (such as pets, domesticated animals, or wild animals).

Figure 2:
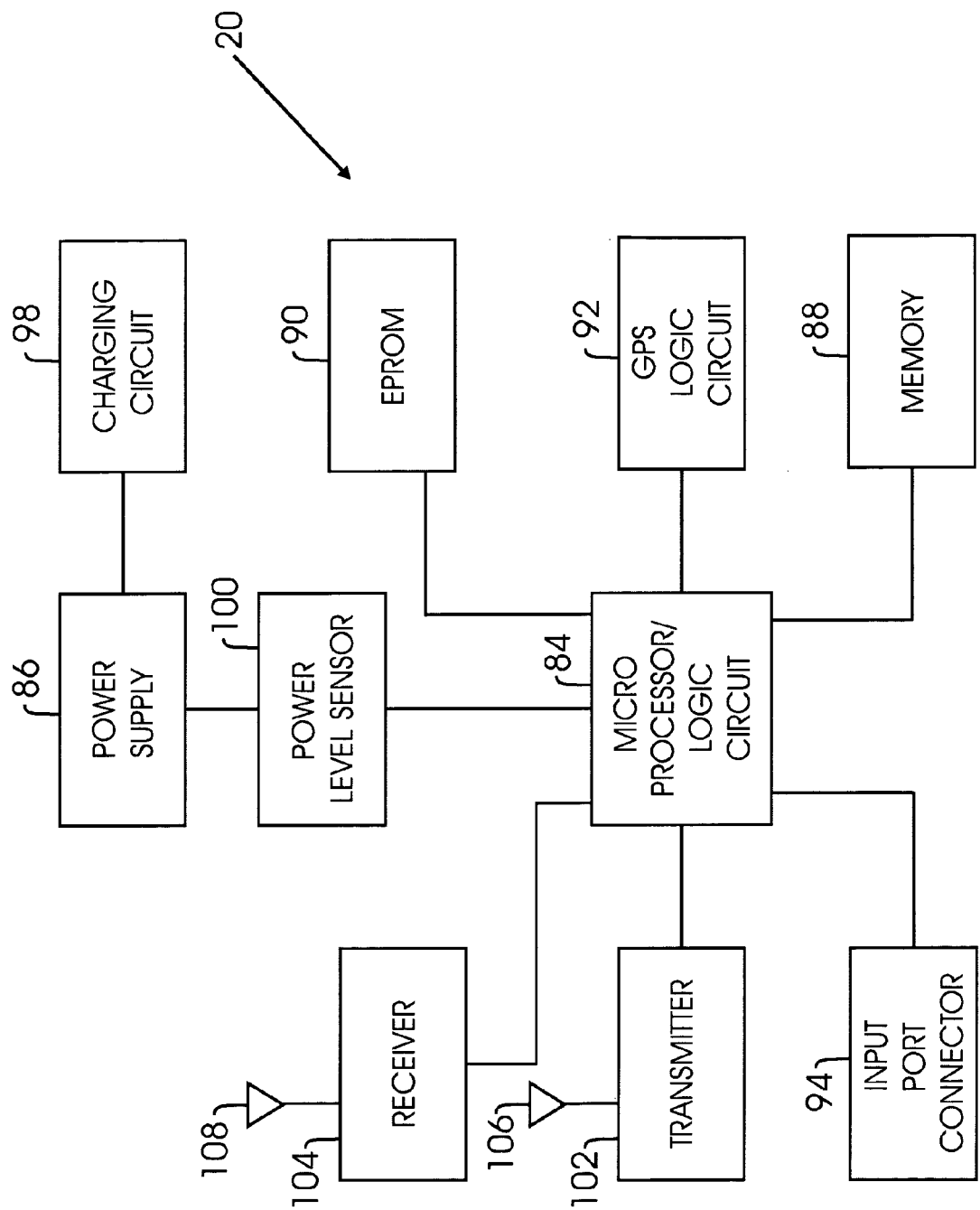
FIG. 2 is a schematic block diagram of a tracking device used for a positioning and tracking system, according to another embodiment of the present invention.

In FIG. 2, a block diagram of the tracking device 20 is shown. The tracking device 20 may comprise a signal receiver 104 for receiving a signal from the monitoring station 12 (shown in FIGS. 1A-C). The signal may include the user's identification code (second identification code), sent by the user 44 (shown in FIGS. 1A-C). The tracking device 20 may comprise a microprocessor/logic circuit 84 for storing a first identification code to produce a stored identification code, determining a location of the tracking device 20, and generating a position signal that contains location data (such as a longitudinal, latitudinal, and elevational position, an address, a nearby landmark, and the like) regarding the tracking device 20.

The tracking device 20 may comprise an erasable programmable read-only memory (EPROM) 90 for storing operating software for the microprocessor/logic circuit 84. A global positioning system logic circuit 92 may be used for calculating location data (such as a longitudinal, latitudinal, and elevational position, an address, a nearby landmark, and the like) for the tracking device 20 to be sent to the microprocessor/logic circuit 84 and subsequent transmission to the monitoring station 12 (shown in FIGS. 1A-C).

The tracking device 20 may comprise a signal transmitter 102 and a signal receiver 104. An antenna 106 may be connected to the signal transmitter 102 and an antenna 108 may be connected to the signal receiver 104. The signal transmitter 102 may allow the tracking device 20 to transmit the signal 38 (shown in FIGS. 1A-C) to the monitoring station 12 (shown in FIGS. 1A-C) and thus transmit location data (such as a longitudinal, latitudinal, and elevational position, an address, a nearby landmark, and the like).

The signal receiver 104 may allow the tracking device 20 to receive the signal 38 (shown in FIGS. 1A-C) from the monitoring station 12 (shown in FIGS. 1A-C) to allow the user 44 (shown in FIGS. 1A-C) to send a location request by at least one of a telephone communication and an electronic message via the Internet.

An input port connector 94 may be connected to the microprocessor/logic circuit 84 for inputting the stored identification code (first identification code) for storage in memory 88. The microprocessor/logic circuit 84 may be connected to receive operating power from a power supply 86. The power supply 86 may be any type of battery that is small enough to fit inside of the tracking device 20. A charging circuit 98 may be connected to the power supply 86 for recharging the power supply. The charging circuit 98, for example, may be a charging circuit such that an external magnetic battery recharger may provide recharging electricity to the charging circuit 98 for recharging the power supply 86 whenever the power falls below a predetermined level.

A power level sensor 100 may be connected between the power supply 86 and the microprocessor/logic circuit 84 for sensing the power level of the power supply 86 and providing the sensed power level to the microprocessor/logic circuit 84. The microprocessor/logic circuit 84 may generate a power level signal to be transmitted with the signal 38 (shown in FIG. 1) transmitted by the signal transmitter 102.

Figure 3I:
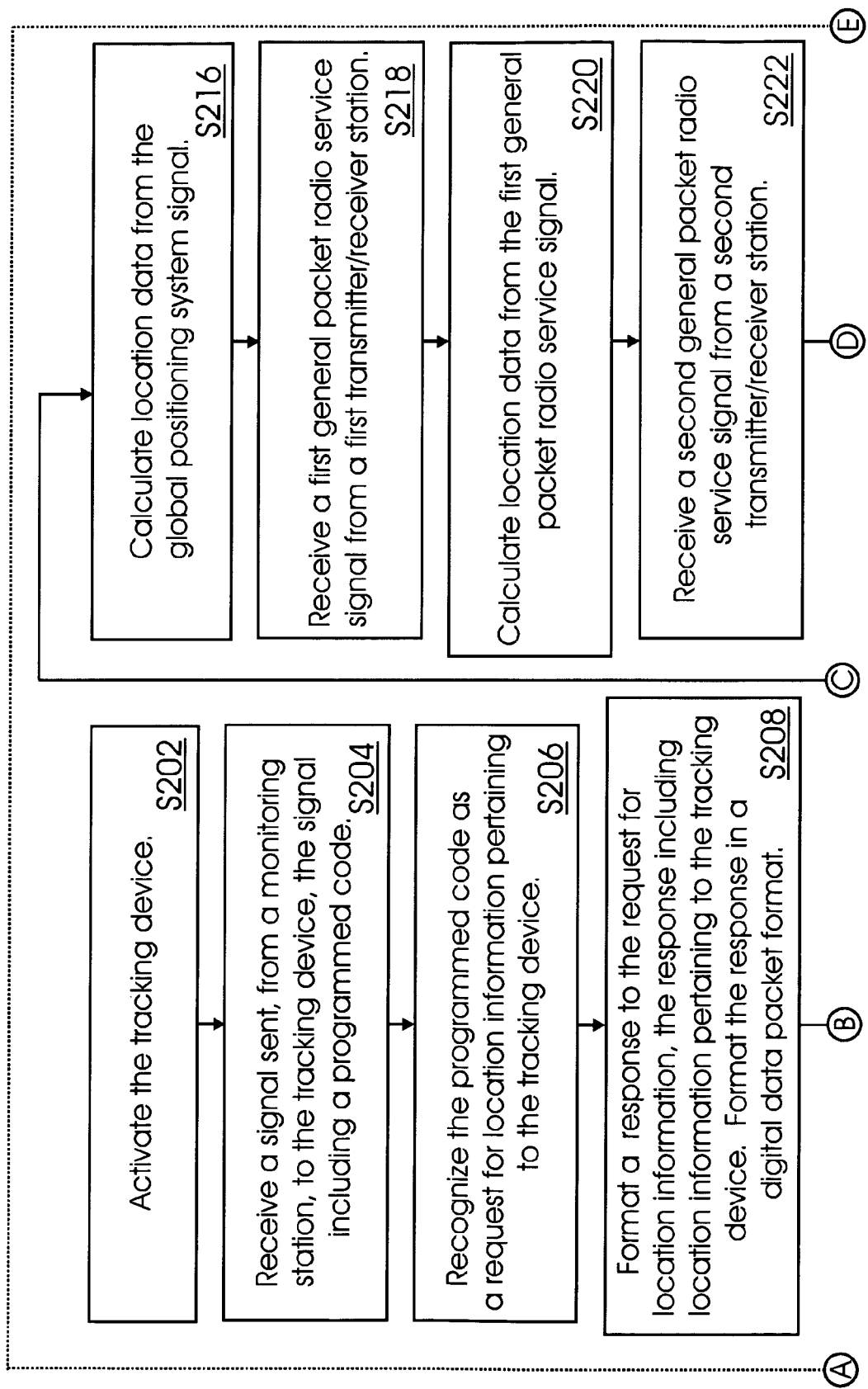
FIG. 3 schematically represents a series of steps of a method for locating a tracking device, according to yet another embodiment of the present invention.
Figure 3:
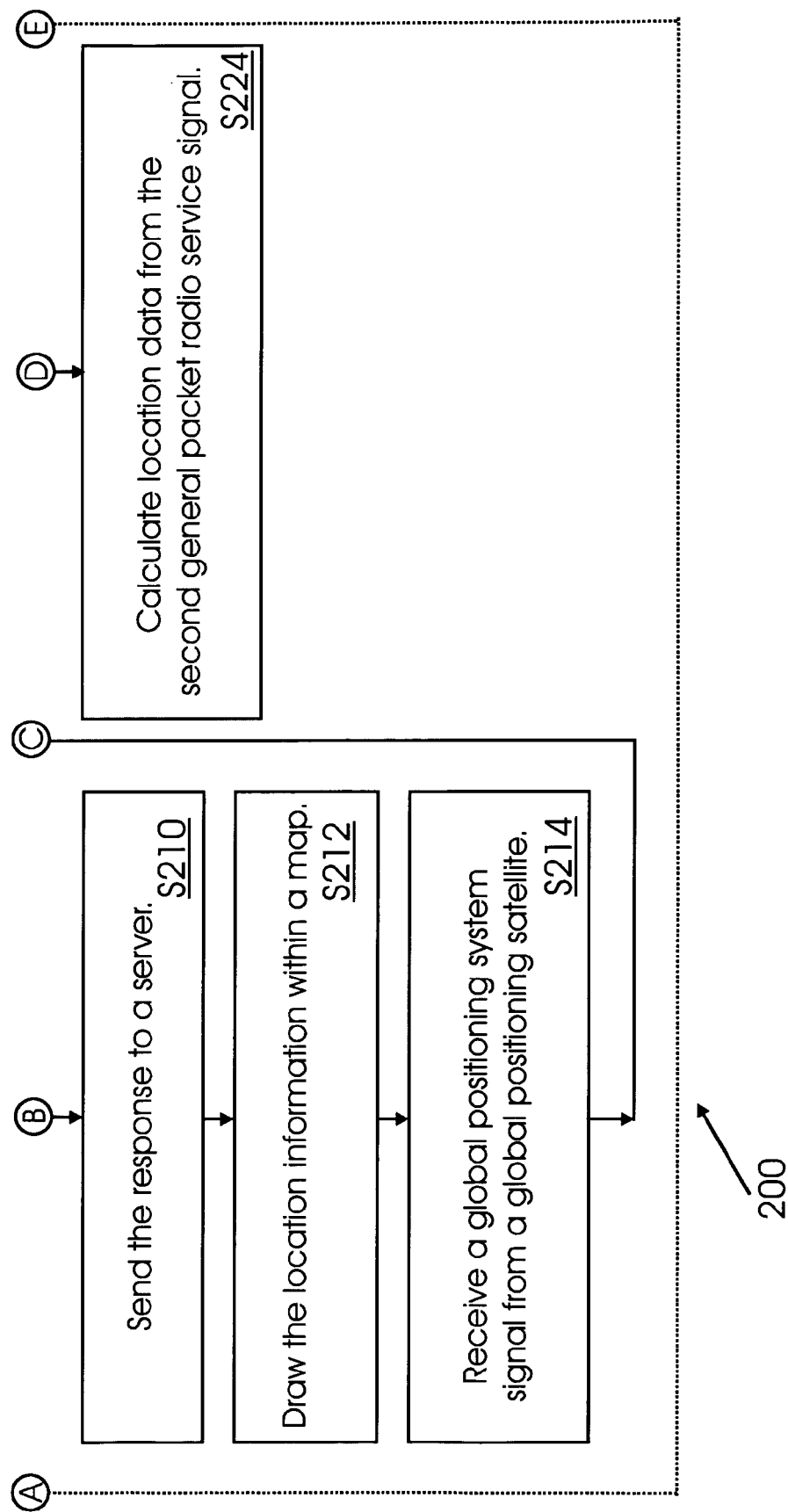

FIG. 3 shows a method 200 for locating a tracking device. A step S202 may comprise activating the tracking device. A step S204 may comprise receiving a signal sent, from a monitoring station, to the tracking device, the signal including a location request. Recognizing the signal as a request for location information pertaining to the tracking device may comprise a step S206.

A step S208 may comprise formatting a response to the location request, the response including location data pertaining to the tracking device. The formatting step, S208, may include formatting the response in a digital data packet format.

Sending the response to a server may comprise a step S210, while drawing the tracking device location within a map may comprise a step S212. The tracking device location may be drawn within a map with a mapping service, such as the Kivera Location Engine™ provided by Kivera, Incorporated of Oakland, Calif., in the United States or the MapQuest™ mapping service provided by MapQuest, Incorporated of Denver, Colo., in the United States.

The mapping service may use location data, such as the longitudinal, latitudinal, and elevational position, to provide an address near the location tracked ("nearest location address") comprising a street name, postal code (zip code) or a nearest known landmark. The mapping service may then forward the location data to the user 44 (shown in FIGS. 1A-C) via the monitoring station 12 (shown in FIGS. 1A-C).

The method 200 may further comprise a step S214 of receiving a global positioning system signal from a global positioning satellite, while a step S216 of calculating location data from the global positioning system signal. A step S218 may comprise receiving a first general packet radio service signal from a first transmitter/receiver station. Calculating location data from the first general packet radio service signal may comprise a step S220.

Continuing with FIG. 3, a step S222 may comprise receiving a second general packet radio service signal from a second transmitter/receiver station, while a step S224 may comprise calculating location data from the second general packet radio service signal.

Figure 4I:
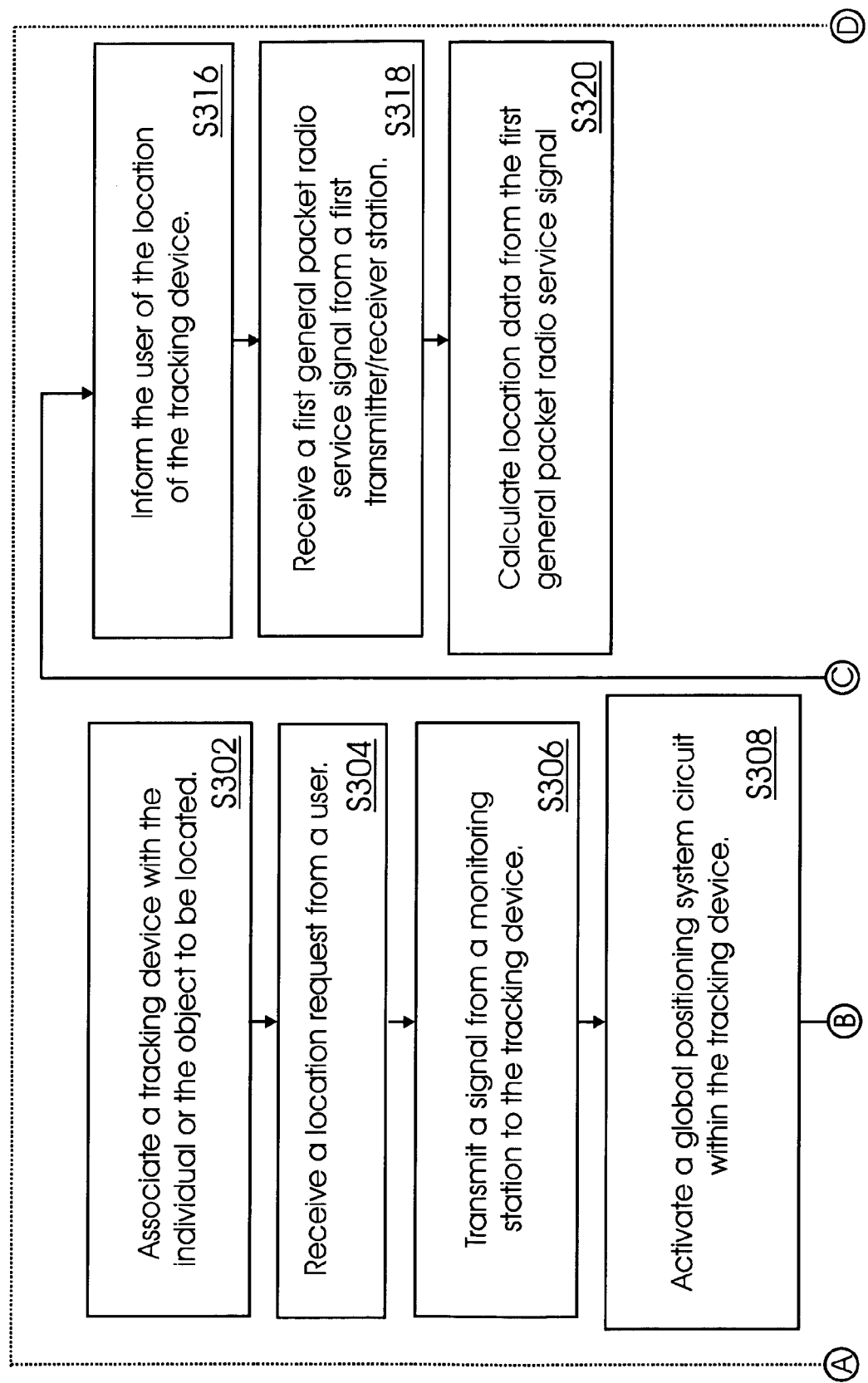
FIG. 4 schematically represents a series of steps of a method for locating an individual or an object, according to yet another embodiment of the present invention.

FIG. 4 shows a flow chart of a method 300 for locating an individual or an object. The method 300 may comprise a step S302 of associating a tracking device with the individual or the object to be located. A step S304 may comprise receiving a location request from a user. Transmitting a signal from a monitoring station to the tracking device may comprise a step S306, while a step S308 may comprise activating a global positioning system circuit within the tracking device. The signal transmitted from the monitoring station to the tracking device may include the user's identification code.

A step S310 may comprise receiving a global positioning system signal. Calculating location data from the global positioning system signal may comprise a step S312, while transmitting the location data to the monitoring station for analysis to determine a location of the tracking device may comprise a step S314. A step S316 may comprise informing the user of the location of the tracking device.

Continuing with FIG. 4, a step S318 may comprise receiving a first general packet radio service signal from a first transmitter/receiver station, while calculating location data from the first general packet radio service signal may comprise a step S320.

For method 300, the tracking device may include a signal receiver for receiving a signal from the monitoring station, including the user's identification code, a microprocessor/logic circuit for storing a first identification code to produce a stored identification code, determine a location of the tracking device, and generating a position signal; an erasable programmable read-only memory; a global positioning system logic circuit; and a signal transmitter.

The tracking device may compare the user's identification code to the stored identification code and upon determining that the user's identification code matches the stored identification code, the signal transmitter transmits the position signal to the monitoring station.

Although the present invention has been described with reference to specific embodiments, these embodiments are illustrative only and not limiting. Many other applications and embodiments of the present invention will be apparent in light of this disclosure and the following claims.

The invention claimed is:

1. A positioning and tracking system, comprising:
a monitoring station to receive a location request and a second identification code from a user and transmitting a signal that includes the second identification code;
a tracking device, the tracking device comprising:
a signal receiver to receive a signal from the monitoring station comprising: the second identification code,
a microprocessor/logic circuit to store a first identification code to produce a stored identification code, calculate location data for the tracking device, and generate a position signal;
a global positioning system logic circuit; and
a signal transmitter;
a first transmitter/receiver station and a second transmitter/receiver station to communicate with each other and the tracking device to determine location of the tracking device without a requirement of line-of-sight between a global positioning system and the tracked device; wherein a latitude and a longitude of the tracking device results from a comparison of measurements from gps satellites to the tracking device, measurements of distances between two or more gps satellites, and measurements of relative orientations of the two or more gps satellites, the tracking device, and earth; and
wherein the tracking device compares the second identification code to the stored identification code and upon determining that the second identification code matches the stored identification code, the signal transmitter transmits the position signal to the monitoring station.

2. The positioning and tracking system of claim 1, wherein the second identification code comprises an electronic serial number, and
wherein to determine location of the tracking device comprises to triangulate location of the tracking device communicated between the first transmitter/receiver station and the second transmitter/receiver station.

3. The positioning and tracking system of claim 1, wherein the tracking device further comprises:
a power supply; and
a charging circuit to recharge the power supply.

4. The positioning and tracking system of claim 1, wherein the monitoring station comprises a database for storing the second identification code, the monitoring station compares the second identification code, received with the location request, to the stored identification code stored in the microprocessor/logic circuit to determine if a user's identification code received, from the user, with the location request is valid.

5. The positioning and tracking system of claim 1, wherein the user provides the location request to the monitoring station by at least one of a telephone communication and an electronic message via the Internet.

6. The positioning and tracking system of claim 5, wherein the monitoring station provides the location data to the user as an electronic message over the Internet when the user provides the location request by an electronic message via the Internet.

7. The positioning and tracking system of claim 5, wherein the monitoring station provides location data to the user as a voice message when the user provides the location request by a telephone communication.

8. A method for locating a tracking device, comprising:
activating the tracking device;
communicating a signal sent, from a monitoring station, to the tracking device, the signal comprising a user's identification code;
recognizing the user's identification code as a location request pertaining to the tracking device;
calculating location data of the tracking device at least partially in response to communications between at least two transmitter/receiver stations and the tracking device and the at least two transmitter/receiver stations without direct line-of-sight between a global positioning system satellite and the tracked device; wherein a latitude and a longitude of the tracking device results from a comparison of measurements from gps satellites to the tracking device, measurements of distances between two or more gps satellites, and measurements of relative orientations of the two or more gps satellites, the tracking device, and earth; and formatting a response to the location request, the response including the location data pertaining to the tracking device;

sending the response to a server; and drawing a tracking device location within a map.

9. The method of claim 8, further comprising:
receiving a global positioning system signal from the global positioning system satellite; and
calculating the location data responsive to the global positioning system signal.

10. The method of claim 8, further comprising:
receiving a first general packet radio service signal from a first transmitter/receiver station; and
calculating the location data responsive to the first general packet radio service signal; wherein the first general packet radio service signal comprises a first alternative service for locating and tracking individuals and objects from that originating from the global positioning system satellite.

11. The method of claim 10, further comprising:
receiving a second general packet radio service signal from a second transmitter/receiver station; and
calculating the location data responsive to the second general packet radio service signal and the first general packet radio service signal in at least one of an indoor setting and when a location of the tracked device is obstructed from view by the global positioning system satellite;
wherein the second general packet radio service signal comprises a second alternative service for locating and tracking the individuals and the objects from that originating from the global positioning system satellite.

12. The method of claim 8, further comprising the step of providing a charging circuit within the tracking device responsive to charging from an external battery charger when a power level of the tracking device falls below a predetermined level.

13. A method for locating an individual or an object, comprising:
associating a tracking device with the individual or the object to be located;
receiving a location request from a user;
transmitting a signal from a monitoring station to the tracking device;
activating a global positioning system circuit within the tracking device;
communicating a reference signal to triangulate location information utilizing a first transmitter/receiver station and a second transmitter/receiver station;
receiving a global positioning system signal, a first transmitter/receiver station signal, and a second transmitter/receiver station signal;
calculating location data responsive to the global positioning system signal, the first transmitter/receiver station signal, the second transmitter/receiver station signal, and the reference signal without line-of-sight between a global positioning system satellite and the tracked device;
calculating the location data of the tracking device resulting from a comparison of measurements from gps satellites to the tracking device, measurements of distances between two or more gps satellites, and measurements of relative orientations of the two or more gps satellites, the tracking device, and earth;
transmitting the location data to the monitoring station to determine location of the tracking device; and
informing the user of the location of the tracking device.

14. The method for locating an individual or an object of claim 13, wherein the signal transmitted from the monitoring station to the tracking device comprises a user's identification code.

15. The method for locating an individual or an object of claim 13, wherein the tracking device comprises:
a signal receiver for receiving the signal from the monitoring station to the tracking device, including a user's identification code;
a microprocessor logic circuit for storing a first identification code to produce a stored identification code, determining a location of the tracking device, and generating a position signal;
a global positioning system logic circuit; and
a signal transmitter.

16. The method of claim 13, wherein receiving the first transmitter/receiver station signal comprises:
receiving a first general packet radio service signal from the first transmitter/receiver station; and
calculating location data responsive to the first general packet radio service signal; wherein the first general packet radio service signal comprises an alternative service for locating and tracking individuals and objects from that originating from the global positioning system satellite.

17. The method of claim 15, wherein the tracking device compares the user's identification code to the stored identification code and upon determining that the user's identification code matches the stored identification code, the signal transmitter transmits the position signal.

18. The method of claim 13, further comprising the step of communicating by the user the location request by telephone.

19. The method of claim 13, further comprising the step of providing a charging circuit within the tracking device responsive to an external battery charger and charging the tracking device when a power level of the tracking device falls below a predetermined level.

20. The method of claim 15, further comprising the step of transmitting location data comprising an address of a nearby landmark.

21. The method of claim 15, further comprising the step of communicating through a public switched telephone the location request to the tracking device to provide an address of the tracking device; a power level of the tracking device; distance from one or more satellites; a distance from the first transmitter/receiver station and the second transmitter/receiver station; and an elevational position of the tracking device.

* * * * *